United States Patent [19]
Collica et al.

[11] 3,983,717
[45] Oct. 5, 1976

[54] RING WITH CHANGEABLE RADIATION DOSIMETER

[75] Inventors: Carl Collica, New Rochelle; Leonard Epifano, Rye; Ralph Farella, Scarsdale, all of N.Y.

[73] Assignee: Medi-Ray, Inc., Tuckahoe, N.Y.

[22] Filed: Feb. 3, 1975

[21] Appl. No.: 546,534

[52] U.S. Cl. .................. 63/1 R; 63/29 R; 250/484
[51] Int. Cl.² ............................ A44C 9/02
[58] Field of Search ............ 63/1 R, 29 R, 15, 19; 250/337, 484; 40/311

[56] References Cited
UNITED STATES PATENTS

| | | | |
|---|---|---|---|
| 733,029 | 7/1903 | Gosling | 63/29 R |
| 1,182,534 | 5/1916 | Driggott | 63/29 R |
| 1,711,469 | 4/1929 | Stratford | 40/311 X |
| 2,181,507 | 11/1939 | Chickering | 63/15 |
| 2,778,519 | 1/1957 | McFarlane | 40/311 X |
| 3,039,279 | 6/1962 | Van Bussel | 63/29 R |

Primary Examiner—F. Barry Shay
Attorney, Agent, or Firm—Martin Novack

[57] ABSTRACT

A ring for housing a disc of radiation measuring material comprising a band having a circular shape; a housing integral with the band and formed in a surface thereof, the housing comprising a hollow cylindrical section substantially normal the band surface and terminating in an inwardly disposed annular flange which defines a substantially circular aperture. In a preferred embodiment of the invention a retaining protrusion formed on the inside of the cylindrical section and spaced from the annular flange is provided to retain a plurality of discs mounted in the housing in layered fashion.

1 Claim, 4 Drawing Figures

RING WITH CHANGEABLE RADIATION DOSIMETER

BACKGROUND OF THE INVENTION

This invention relates to the field of dosimetry and, more particularly, to a dosimeter ring.

It is well recognized that in most installations where ionizing radiation is present it is necessary to periodically evaluate the amount of radiation dosage received by the bodies as well as specific body organs and extremities of personnel working in the radiation installation. The International Committee On Radiation Protection has established standards for persons occupationally exposed to radiation and the monitoring of dangerous radiation is required by law. Typically, all personnel wear one or more badges or other devices which contain radiation measuring material, and the badges are periodically examined, for example on a weekly or monthly basis, to determine the cumulative dosage of radiation received by the wearer's body or particular organs of the wearer's body.

For persons who handle ionizing radiation it is also necessary to determine the amount of radiation to which the hands are exposed. This is accomplished by having such personnel wear a ring which contains a radiation measuring material, for example a thermal luminescence dosimeter (TLD). The prior art ring dosimeter includes a flat surface having a small depression in which material can be inserted and held in place with a piece of tape. This type of ring dosimeter, and other prior art dosimeters are disadvantageous in that it is difficult to provide these rings with changeable information that is needed for overall monitoring procedure; e.g., information regarding ring serial numbers, color codes relating to time periods, the wearer's name or identification number, etc. Also, there is no provision for protecting the dosimeter material from damage by water, solvents or other environmental factors to which the hands are normally subjected. Also, since the ring dosimeters must be periodically "loaded" with new materials and somehow marked with new identification information, it would be desirable to have a ring dosimeter that could be conveniently assembled and disassembled without taping but, to applicant's knowledge, no suitable ring dosimeter is presently available.

It is an object of this invention to provide an improved ring dosimeter which serves to overcome deficiencies of the prior art as set forth.

SUMMARY OF THE INVENTION

The present invention is directed to a ring for housing a disc or thin chip of radiation measuring material. In accordance with the invention there is provided a band having a generally circular shape and a housing integral with the band and formed in a surface thereof. The housing comprises a hollow cylindrical section substantially normal to the surface of the band and terminating in an inwardly disposed annular flange which defines a substantially circular aperture.

In a preferred embodiment of the invention a retaining protrusion is formed on the inside of the cylindrical section and spaced from the annular flange, the protrusion being adapted to retain the disc between itself and the annular flange. In this embodiment, a plurality of discs are mounted in the housing in layered fashion, each disc proportioned in accordance with the inner diameter of the cylinder. Preferably, the plurality of discs comprise, in order, a color coded disc, a dosimetry disc, a disc containing printed information and a clear plastic disc, the color coded disc abutting the annular flange.

Further features and advantages of the invention will become more readily apparent from the following detailed description when taken in conjunction with the accompanying drawings.

DESCRIPTION OF THE PREFERRED EMBODIMENT

Figure 1:
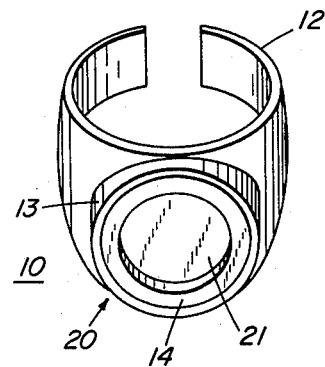
FIG. 1 is a front elevational view of a ring dosimeter in accordance with an embodiment of the invention as assembled with dosimetry and auxiliary materials.

Referring to FIG. 1, there is shown a ring 10 in accordance with the preferred embodiment of the invention, the ring being assembled with specified dosimetry and auxiliary materials. The ring body is preferably formed of a single piece of molded plastic and is provided with an aperture 11 (FIG. 2) through which is visible a colored material that may typically identify a specific monitoring time period (such as a particular week or month) by color code. A band 12 is of opened generally circular shape and widens at its center to accommodate a housing 20 which is integral with the band.

Figure 2:
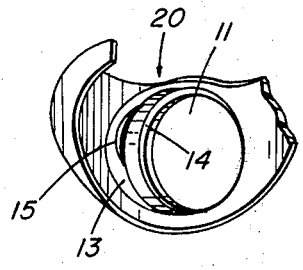
FIG. 2 is a rear partially cutaway perspective view of the blank ring of FIG. 1.
Figure 3:
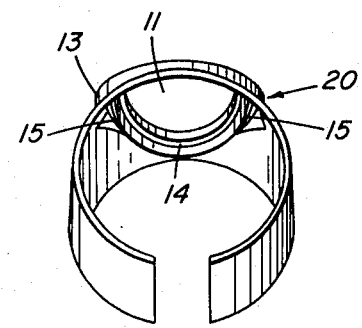
FIG. 3 is a rear elevational view of the blank ring of FIG. 1.
Figure 4:
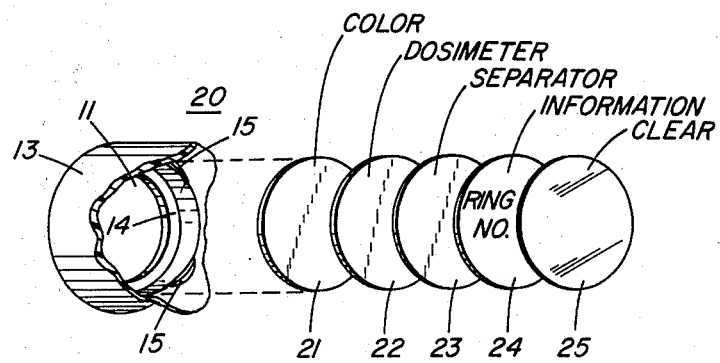
FIG. 4 is a cutaway exploded view of the housing portion of the ring of FIG. 1 and the dosimetry and auxiliary materials contained therein.

The housing 20, illustrated in further detail in FIGS. 2, 3 and 4, comprises a hollow cylindrical section 13 which is substantially normal to the surface of band 12. The cylndrical section terminates at its front end in an inwardly disposed annular flange 14, the inner circumference of which defines substantially circular aperture 11. At least one retaining protrusion 15, and preferably two of them, are formed on the inside of section 13 and spaced from the annular flange 14, the protrusion 15 serving to retain dosimetry and auxiliary discs in the housing.

The cylindrical section 13 is proportioned in accordance with standard sized dosimetry discs, such as TLD discs. In accordance with the invention, discs of auxiliary material are provided which serve the purpose of bearing information and also of protecting the radiation measuring material. For example, in FIG. 4 the following sequence of discs, which can be readily snapped into the ring housing, are shown: a color coded disc 21 which typically identifies a time period; a dosimetry disc 22; a separator disc 23; an information bearing disc 24 which typically identifies the ring number, wearer, or other pertinent information; and a clear protective disc 25. The discs 21, 23 and 25 may typically be formed of plastic and the disc 24 may be a paper "throw away". The dosimeter disc may be any suitable radiation measuring material, for example a TLD lithium fluoride disc.

It will be appreciated that the present invention facilitates the inclusion of information bearing material in a ring as well as the protection of dosimetry and auxiliary materials. The information on disc 24 can be easily read from the back of the ring. Assembly and disassembly of the ring and the auxiliary materials is readily accomplished by the snapping of the discs over the protrusion 15 and into place. The plastic discs provide water resistance and the ring design is not bulky and readily accommodates a glove.

The invention has been described with reference to a particular embodiment but variations within the spirit and scope of the invention will occur to those skilled in the art. For example, the specific disc arrangement shown in FIG. 4 could be modified or a paper tag of any suitable shape could be substituted for the disc 24. In fact, as long as size limitations are met, materials of any desired shape can be employed between the discs 21 and 25. Also, other types of discs, such as selective radiation filters, could be employed in conjunction with the dosimeter disc. Finally, while a finger ring is the preferred configuration, it will be appreciated that the invention applies equally well to other forms, such as a wrist band.

We claim:

1. A dosimeter ring assembly comprising:
   a band having a generally circular shape and a housing integral with the band and formed in a surface thereof,
   said housing comprising a hollow cylindrical section substantially normal to the surface of the band and terminating at its radially outer end in an inwardly disposed annular flange which defines a substantially circular aperture;
   a retaining protrusion formed on the inside of the cylindrical section and spaced from the annular flange;
   a plurality of flexible discs including a color coded disc, a dosimetry disc, and a disc for displaying printed information, said color coded disc abutting said annular flange, whereby it is viewable while said ring is being worn, and said information disc being innermost, whereby it is viewable from inside the ring without the need for disassembly;
   each of said discs being proportioned in accordance with the inner diameter of the cylindrical section, said discs, being mounted in the housing in layered fashion;
   whereby said discs are removable and/or insertible by flexing them past said protrusion.

* * * * *